(12) United States Patent
Pratt et al.

(10) Patent No.: US 8,605,703 B2
(45) Date of Patent: Dec. 10, 2013

(54) METHODS FOR POLARIZATION-BASED INTERFERENCE MITIGATION

(75) Inventors: Thomas G. Pratt, Covington, GA (US); Brett T. Walkenhorst, Douglasville, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 685 days.

(21) Appl. No.: 12/525,297

(22) PCT Filed: Jan. 30, 2008

(86) PCT No.: PCT/US2008/052447
§ 371 (c)(1), (2), (4) Date: Jul. 30, 2009

(87) PCT Pub. No.: WO2008/118529
PCT Pub. Date: Oct. 2, 2008

(65) Prior Publication Data
US 2010/0098044 A1    Apr. 22, 2010

Related U.S. Application Data

(60) Provisional application No. 60/887,201, filed on Jan. 30, 2007, provisional application No. 60/887,221, filed on Jan. 30, 2007.

(51) Int. Cl.
*H04B 7/216* (2006.01)
*H04B 7/212* (2006.01)

(52) U.S. Cl.
USPC ............ 370/342; 370/347; 375/267

(58) Field of Classification Search
USPC .................. 370/342, 347; 375/267
See application file for complete search history.

(56) References Cited

U.S. PATENT DOCUMENTS

| | | | |
|---|---|---|---|
| 6,823,170 B1 * | 11/2004 | Dent | 455/13.3 |
| 7,092,452 B2 * | 8/2006 | Taylor et al. | 375/267 |
| 7,110,554 B2 * | 9/2006 | Brennan et al. | 381/94.7 |
| 2003/0020651 A1 * | 1/2003 | Crilly et al. | 342/378 |
| 2005/0058230 A1 * | 3/2005 | Thomas et al. | 375/347 |
| 2005/0190725 A1 * | 9/2005 | Wakisaka et al. | 370/334 |
| 2005/0190848 A1 * | 9/2005 | Kiyanagii et al. | 375/260 |
| 2007/0211827 A1 * | 9/2007 | Baggen et al. | 375/316 |

* cited by examiner

*Primary Examiner* — Kenny Lin
(74) *Attorney, Agent, or Firm* — Dustin B. Weeks, Esq.; Ryan A. Schneider, Esq.; Troutman Sanders LLP

(57) ABSTRACT

A method for mitigating interference for a received wireless signal comprises at least three steps. The method comprises receiving a wireless signal with a receiver device. The wireless signal includes at least an interference signal and a desired signal. The method further comprises breaking the received wireless signal into sub-bands; and filtering the received wireless signal with a polarization filter, in order to separate the interference signal from the desired signal.

12 Claims, 6 Drawing Sheets

METHODS FOR POLARIZATION-BASED INTERFERENCE MITIGATION

CROSS-REFERENCE TO RELATED APPLICATIONS

This application is a 35 U.S.C. §371 U.S. National Stage of International Application No. PCT/US2008/052447 filed 30 Jan. 2008, which claims priority to and the benefit of U.S. Provisional Patent Application Nos. 60/887,201 and 60/887,221, both filed 30 Jan. 2007, the entire contents and substance of which are hereby incorporated by reference as if fully set forth below.

STATEMENT REGARDING FEDERALLY SPONSORED RESEARCH OR DEVELOPMENT

This invention was made with United States Government support in the Communications and Networks Consortium sponsored by the United States Army Research Laboratory under the Collaborative Technology Alliance Program, Cooperative Agreement No. DADD19-01-2-0011. The United States Government has certain rights in this Invention.

BACKGROUND

1. Field of the Invention

The present invention relates to wireless signals and, more particularly, to a method for mitigating interference of wireless signals through polarization-based processing of sub-bands of a received signal.

2. Description of Related Art

Wireless communications technology has grown immensely in recent years and proliferated throughout the world to enable high speed voice, video, and/or data communication without the need for a physical connection between the sender and receiver. Such devices are often built to operate over a pre-determined band of frequencies, usually designated by some national licensing authority, such as the United States Federal Communication Commission. By using different frequency channels, multiple radios have been able to operate simultaneously without interfering with one another by filtering to eliminate energy in frequencies outside the desired channel. This concept is as old as the invention of the radio. It can often happen, however, that interfering energy (either intentionally or otherwise) impacts the receiver's antenna(s) at frequencies within the desired channel. Oftentimes, such energy is designated as co-channel interference (CCI).

Traditional frequency-domain filtering is useless in mitigating CCI, so other dimensions of processing to deal with the problem have been researched, such as spatial filtering and polarization filtering. In contrast with the frequency-domain filtering, these other types of filtering require the use of multiple antennas (i.e., an antenna array) and some method of combining the signals from each antenna to achieve some mitigation of the interference.

For example, one exemplary description of polarization-based filtering is disclosed in R. Compton, "On the Performance of a Polarization Sensitive Adaptive Array", IEEE Transactions on Antennas and Propagation, Vol. AP-29, No. 5, September 1981 (herein "Compton"). Compton describes spatial filtering, where an antenna array is composed of single antennas separated by some distance in space from one another. Such an array is limited in its ability to effectively differentiate between signals that arrive from the same direction (i.e., the angle of arrival). Further, Compton discloses how an array composed of orthogonally polarized elements may effectively mitigate one or the other of two signals even when they arrive from the same direction by filtering based on the polarizations of the two signals.

For instance, an electromagnetic wave is composed of both an electric field (E-field) and a magnetic field (H-field), collectively these fields form a right angle. The polarization of the wave may be defined as the direction of the E-field as a function of space and time. Notably, a linearly polarized wave is present if the E-field points in a single direction as it oscillates at a certain frequency. If the E-field traverses a path as time progresses, it may trace an ellipse in general, which is referred to as an elliptically polarized wave. By using an antenna array with two orthogonally polarized antennas (e.g., horizontal and vertical), it is possible to transmit and/or receive many polarizations in azimuth by appropriately combining the two antenna outputs (to receive) or appropriately splitting the signal to be transmitted to feed the two antennas. Such an antenna array is designated as a "dual-polarized antenna" and considers the effect of combining the two outputs of such an array as a means of polarization-based filtering.

Before Compton, most analytical studies of adaptive arrays assumed the presence of co-polarized elements. This assumption, although useful for certain purposes, tacitly eliminated consideration of the effects of signal polarization on array performance. In essence, the assumption was that all signals arrive at the array with the same polarization. If an array receives and uses more than one polarization, its performance can be far superior to one that does not. For example, an array of co-polarized elements predominantly yields poor performance if interference arrives too close to the desired signal. When an array adapts to polarization, however, this difficulty occurs only if both signals have the same polarization as well as angle of arrival. When two signals arrive from the same direction, it is possible to null one signal and not the other, assuming their polarizations are different.

Compton describes an array of two pairs of crossed dipoles and computing the output signal-to-interference-plus-noise ratio (SINR) from this array when a desired signal and an interference signal arrive with arbitrary polarizations and angles of arrival. The result in most cases showed that interference has little effect on the array output SINR, unless it arrives from the same direction and has the same polarization as the desired signal.

In addition, as described in T. Pratt and S. Nguyen, "Polarization Mode Dispersion Characterization of Wireless Channels with Multipath", submitted to the IEEE Transactions on Wireless Communications, October 2006 (see also U.S. Ser. Nos. 60/887,207 and 60/887,221, both filed 30 Jan. 2007) (herein "Pratt"), the phenomena of polarization mode dispersion (PMD) and polarization-dependent loss (PDL) have been theoretically predicted and empirically observed in typical wireless communications channels. PMD and PDL are phenomena that have been observed and rigorously studied in single-mode optical fiber (SMOF) applications and result in the corruption of a purely polarized signal by dispersion (or spreading) of the signal's polarization as a function of frequency and signal attenuation as a function of the original polarization. The same formalism developed to study global PMD and PDL effects in optical fiber can be directly applied to the wireless channel medium.

Experiments demonstrating the existence of PMD and PDL in wireless channels are disclosed in Pratt. By means of a wireless transmission and the reception of the signal by a dual-polarized antenna, the PMD was observed by breaking the signal into sub-bands and plotting the polarization on the Poincaré sphere as a function of frequency. The Poincaré sphere may be considered a graphical tool that can represent many polarization states. Some useful features of the Poincaré sphere include: a point plotted on the equator of the sphere represents a linear polarization; the two poles represent left- and right-hand circular polarization; and two orthogonal polarizations are represented by points on opposite sides of the sphere. The plot of those polarizations as a function of frequency reveals the frequency-dependent nature of the polarization of the signal as it passes through the wireless medium.

Even when PMD and PDL is taken into consideration, the receiver of a wireless signal receives a significant amount of interference that has been commonly ignored. Mitigating this interference is necessary.

Accordingly, there is a need for a method of mitigating interference of a received signal in wireless communications. It is to such a method and system that the present invention is primarily directed.

SUMMARY OF THE INVENTION

Briefly described, in preferred form, the present invention is a method for mitigating interference for a received wireless signal. The method comprises receiving a wireless signal with a receiver device, wherein the wireless signal contains both an interference signal and a desired signal; breaking the received wireless signal into sub-bands; and filtering the received wireless signal with a polarization filter, in order to separate the interference signal from the desired signal. The method can further comprise processing the wireless signal for retrieving the desired signal, or more specifically, the transmitted information/data.

The wireless signal can operate in various domains, including for example but not limited to an orthogonal frequency division multiplexing (OFDM) system, a code division multiple access (CDMA) system, and the like.

According to one aspect of the present invention, the polarization filter used to filter the received wireless signal is a frequency-based polarization filter.

These and other objects, features and advantages of the present invention will become more apparent upon reading the following specification in conjunction with the accompanying drawing figures.

DETAILED DESCRIPTION

Figure 1:
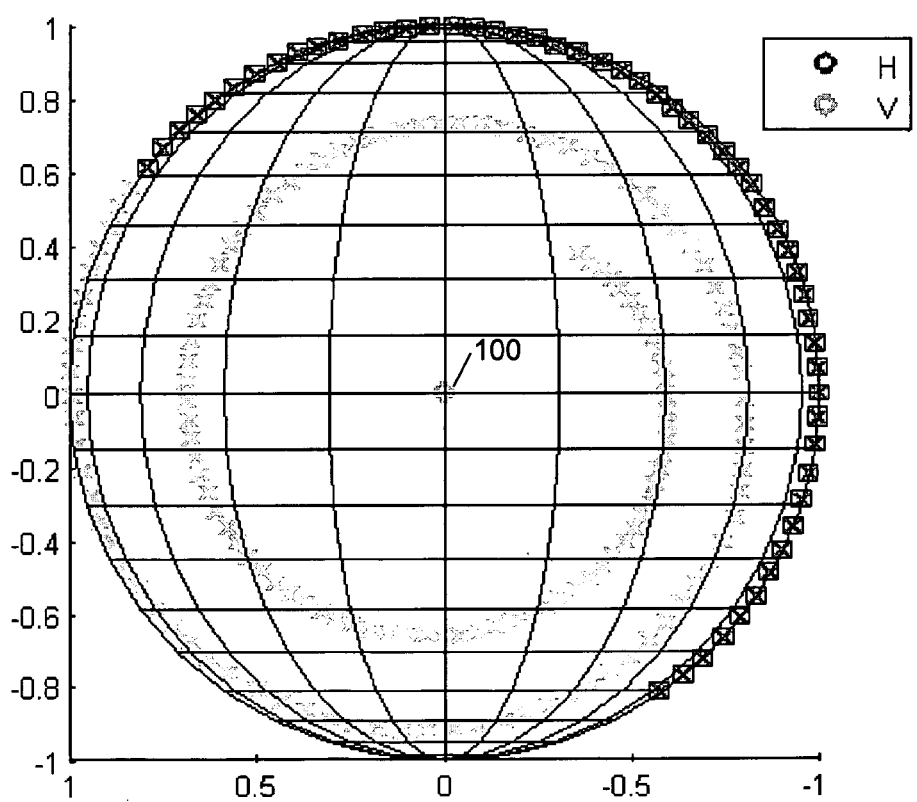
FIG. 1 illustrates a graphical representation of received polarization of 200 received orthogonal frequency division multiplexing (OFDM) sub-channels, in accordance with an exemplary embodiment of the present invention.

To facilitate an understanding of the principles and features of the invention, it is explained hereinafter with reference to its implementation in an illustrative embodiment. In particular, the invention is described in the context of being a method for mitigating interference of a received signal. More particularly, the invention is described in the context of a method for mitigating interference of a received signal in an orthogonal frequency division multiplexing (OFDM) system.

The invention, however, is not limited to its use as a method of mitigating interference in an OFDM system. Rather, the invention can be used when operating in other wireless communications systems for mitigating interference at the receiver side of the system. For example, the present invention can be applied to a code division multiple access (CDMA) system and various other communication systems having different modulation formats, which may or may not require additional processing. According to one aspect of the invention, in order to apply the present invention to such a system, in addition to the description hereafter, it may be necessary to reassemble the signal sub-bands by means of equalization prior to demodulation. The system and method described hereinafter as a method for mitigating interference can also find utility for other applications, beyond that of an OFDM system.

In an exemplary embodiment, the present invention is a method for mitigating interference for a received wireless signal. The method comprises receiving a wireless signal with a receiver device. Preferably, the wireless signal contains at least an interference signal and a desired signal. The method further comprises breaking the received wireless signal into sub-bands; and filtering the received wireless signal with a polarization filter, in order to separate the interference signal from the desired signal. In addition, the method may further comprise processing of the wireless signal, including demodulation to recover the desired signal or the transmitted information/data.

The use of polarization-based architectures—which the present invention includes—for interference mitigation has distinct advantages over purely spatial diversity as noted by Compton (described supra). For example, if two signals arrive at an array from very closely spaced incidence angles, a typical array may have difficulty differentiating between them. If these same signals have different polarizations, it may be possible to separate them or suppress one of them by using orthogonally polarized antenna elements in the array. Due to the phenomenon of PMD observed in wireless channels and the consequent frequency-dependent nature of the received polarization, a frequency-domain polarization filter can be implemented in a preferred embodiment of the present invention to exploit the frequency-dependent nature of the polarization state.

In polarization space, there is a limit on the number of degrees of freedom available. The theoretical possibility of six orthogonal polarizations using three electric dipoles and three magnetic dipoles is known. Given the current state of technology, however, for most practical systems, the limit is two orthogonal polarizations. Consequently, using purely polarization-based processing, a single interferer can be canceled. When the interference environment becomes more complicated, other dimensions of processing should be considered, such as space, beam, successive interference cancellation, and the like. As technology progresses, however, it may be possible to cancel several interferers simultaneously using pure polarization filtering.

It has been observed in measured data that a signal passed through a simple wireless channel experiences polarization mode dispersion (PMD) similar to that observed in a single mode optical fiber (see Pratt). This can be explained by a two path multi-path model in which the two components experience different delays and polarizations. Because of this PMD, the typical full band processing that is usually used for suppression is suboptimal for wideband signals. Sub-band processing is preferable because the dispersion over a small frequency band is negligible compared with the entire band.

Embodiments of the present invention can implement sub-band polarization (SP) processing for interference suppression using OFDM data. An OFDM sub-carrier channel estimate can be used to perform polarization-based processing on each sub-carrier. Further, as described herein, the feasibility of the present invention has been demonstrated in experiments involving the collection of an OFDM signal using a slant-45° polarized antenna for transmission to provide approximately equal power at the vertical and horizontal ports of the dual-polarized receive antennas.

Referring now to the figures, wherein like reference numerals represent like parts throughout the view, the present invention will be described in detail. The present invention comprises a method of mitigating interference of a received wireless signal.

In one exemplary embodiment, a dual-polarized antenna architecture can be implemented in channels exhibiting polarization mode dispersion (PMD) to perform polarization-based interference suppression. In a wireless domain, OFDM signals can be transmitted from an antenna of many polarizations, for example and not limitation a slant-45° antenna, and be received via the dual-polarized antenna.

The received OFDM signals comprise both a vertical signal and a horizontal signal. The vertical signal (V) and horizontal signal (H) received may be corrupted by synthesized broadband interference with arbitrary polarization, i.e., there is an interference signal. Channel estimates can be formed for the received OFDM signal, as well as for the interference signal. Further, filter weights can be computed to improve the SINR (signal to interference-plus-noise ratio). These filter weights may be formed by various methods including minimum mean square error (MMSE), zero-forcing, and the like. In one aspect of the present invention, the filter may be constructed using MMSE characteristics. By considering the polarization state associated with the MMSE weights on a Poincaré sphere, the behavior of the filter weights relative to the input signal-to-interference ratio (SIR) and the polarization states of the desired and interference signals can be ascertained.

In a preferred embodiment, the method of mitigating interference includes at least three steps. Specifically, the method includes receiving the wireless signal with a receiver device, the wireless signal comprising at least an interference signal and a desired signal; breaking the received wireless signal into sub-bands; and filtering the received wireless signal with a polarization filter to separate the interference signal from the desired signal.

For instance, in one embodiment, an interference signal composed of white Gaussian noise can be synthesized with a bandwidth of approximately 18 MHz, and then added to the received signal at a complex baseband with a purely horizontal polarization. The polarization dispersion pattern of the synthesized interference can include 200 co-located points on a back side of a sphere, as graphically illustrated in FIG. 1. More specifically, FIG. 1 illustrates 200 points representing the desired signal polarization.

In an exemplary embodiment of the method, the wireless signal or data received with the receiver includes an interference signal, a noise signal, and a desired signal. Accordingly, it is assumed that the received data has the form of:

$$\bar{x} = a_d \bar{h}_d + a_I \bar{h}_I + \bar{n}.$$

The variables $\bar{x}$, $\bar{h}_d$, $\bar{h}_I$, and $\bar{n}$ are preferably two by one vectors associated with horizontal and vertical elements of the received data ($\bar{x}$) desired signal ($\bar{h}_d$), interference signal ($\bar{h}_I$), and noise ($\bar{n}$). Further, $a_d$ is the transmitted desired signal and $a_I$ is the transmitted interference signal. As is common with OFDM, the OFDM system comprises a plurality of sub-carriers.

The output of the processing is given by applying a first weight vector to the received data, such that $$\bar{y} = \bar{w}^H \bar{x},$$

wherein $\bar{y}$ is the output of the processed, received wireless signal, and $\bar{w}^H$ is the first weight vector. So by multiplying the received data $\bar{x}$ by the conjugate transpose of the first weight vector $\bar{w}^H$, the output $\bar{y}$ can be processed, and thus ascertained. In essence, a step of processing the received wireless signal occurs by applying the first weight vector to the received data.

When operating in OFDM, the breaking of the wireless signal into sub-bands can occur automatically. In fact, this is one of the many advantages of operating in an OFDM system. The breaking of the wireless signal into sub-bands preferably occurs before weights are computed or polarization-based processing occurs. Notably, a separate weight vector may be applied for each sub-band, or sub-carrier.

Using the channel estimates from the desired signal and the known channel information from the synthesized interference, the weight vector can be calculated for each sub-carrier from the solution to a Wiener-Hopf equation (i.e., Wiener filter). Specifically, the method can calculate a second weight vector for each sub-carrier by using channel estimates from the desired signal ($\bar{h}_d$) and known channel information from the interference signal ($\bar{h}_I$) the weight vector having the form of:

$$\bar{w}_{opt} = R_{xx}^{-1} \bar{r}_{xd},$$

wherein $\bar{w}_{opt}$ is the second weight vector, $R_{xx}$ is a autocorrelation matrix, and $\bar{r}_{xd}$ is a cross-correlation vector.

The autocorrelation matrix and cross-correlation vector are given by $$R_{xx} = E\{\vec{x}\vec{x}^H\} = P_d \vec{h}_d \vec{h}_d^H + P_I \vec{h}_I \vec{h}_I^H + \sigma^2 I$$

and $$\vec{r}_{xd} = E\{\vec{x} a_d^*\} = P_d \vec{h}_d,$$

wherein $P_d$ and $P_I$ are the average desired and interference signal powers, respectively; $\sigma^2$ is the noise power, and I is the identity matrix. In this case, the noise power is unknown, but diagonal loading of the autocorrelation matrix is employed using values 30 dB below the average energy of the elements of $R_{xx}$.

Further, channel estimates for each of the sub-carriers can be used to determine $h_d$. In addition, $P_I$ and $h_I$ are given by the parameters used to synthesize the interference. Weight vectors can be computed and applied for each sub-carrier and then channel equalization is performed to yield soft decisions. This method presumes knowledge of the channel state information for both the desired signal and the interference.

The method of mitigating interference can be implemented in a variety of applications. For example and not limitation, sensor networks, ad-hoc networks, and cognitive radios often desire the mitigation of interference when receiving wireless signal. Further, co-site suppression and near site signal suppression can utilize interference mitigation according to the methods described herein. Additionally, the method of mitigating interference can be used with adaptive polarization controlling.

Example of Collection System and Data Format (i.e., Experiment)

Experiments using OFDM signals can demonstrate the performance of the present invention. For example, simulated OFDM signals can have a bandwidth of approximately 18 Megahertz (MHz), which contain 256 sub-carriers; 200 of which carry data from a 64 quadrature amplitude modulation (QAM) constellation, while the remaining 56 sub-carriers are zero-padded. Preferably, the OFDM signal is repeated approximately 40 times in a frame. The preamble of this OFDM signal includes a synchronization word and the IEEE 802.16 short and long preamble for channel estimation. Further, this simulated OFDM signal can be synthesized using many types of mathematical computing software, such as, for example, MatLab®, and transmitted via a signal generator, for example and not limitation Agilent® ESG-4438C, at approximately a slant-45° polarization.

On the other end of this experiment, the receiver can be composed of a dual-polarized antenna and a two-channel data acquisition board. The data received via the dual-polarized antenna is digitized, down-converted, decimated, and ported to a processing unit for offline processing. The data is collected in a short range line-of-sight channel.

Figure 2:
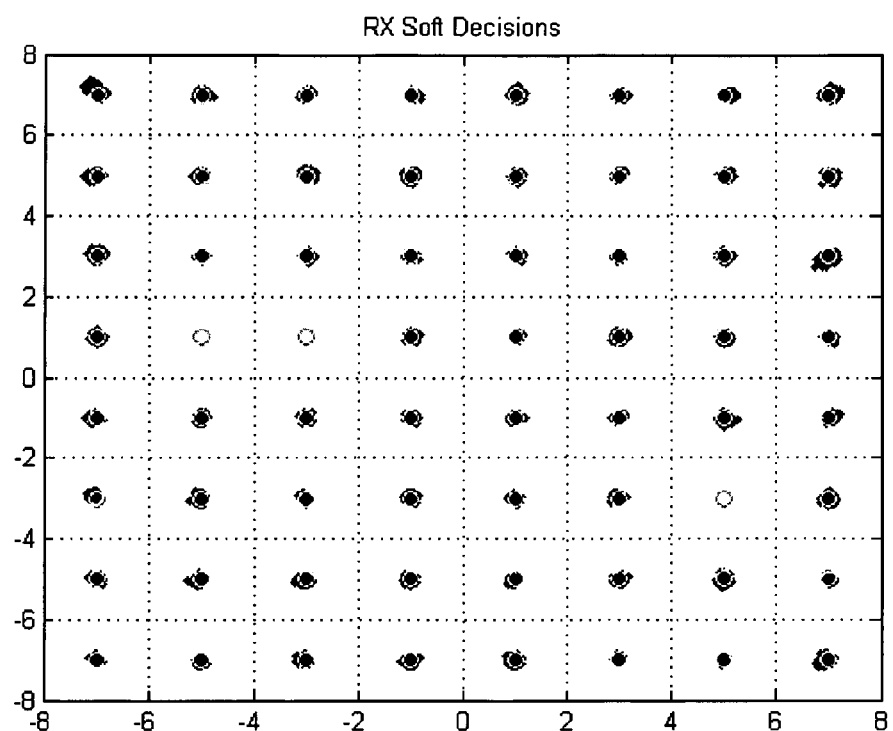
FIG. 2 illustrates a graphical representation of soft decisions of a single OFDM frame with no interference and no processing, in accordance with an exemplary embodiment of the present invention.

The signal that is received may have a rather high signal to noise ratio (SNR), and can be demodulated using either of the two polarization states at the receiver. The plot illustrated in FIG. 2 depicts soft decisions of a demodulated frame using the horizontally polarized component. Soft decisions are symbol estimates before slicing of the signal. For instance, soft decisions occur after the processing has been completed, just before hard decisions are determined, (before the location of the symbols are fixed). For example, if working in QPSK (quadrature phase shift keying), a soft decision that falls in the upper right quadrant will be assigned to the symbol represented by the upper right symbol in the constellation. Generally, soft decisions are sliced to the nearest symbol position to yield the hard decisions. The dots of FIG. 2 indicate received soft decisions, while the circles illustrate the transmitted symbol positions.

As mentioned, each frame can be composed of a single OFDM signal repeated 40 times. In such an OFDM signal, three of the 64 QAM signals are not used at all, and thus they fail to appear in the demodulated signal.

Using the sub-carrier channel estimates associated with each of the two receive polarization components (i.e., V and H), the polarization state of the OFDM symbol can be plotted as a function of frequency on the Poincaré sphere. Again, FIG. 1 illustrates the resulting polarization dispersion of the received signal.

Referring to FIG. 1, the reference for vertical polarization is illustrated by the circle 100 in the center of the plot. Horizontal polarization is on the opposite side of the sphere and thus is hidden from view. The polarization states of the received signal sub-carriers are indicated. The marker indicates the sub-carrier polarization state is on the front of the sphere (closer to the vertical polarization than horizontal) and the opposite if the polarization state corresponds to the back of the sphere (i.e., closer to the horizontal polarization). The dispersion pattern of the received signal can be a spiral, which means that the amplitudes of the polarization components vary relative to one another as a function of frequency, indicating a frequency-selective channel.

The observed PMD, or frequency dependent polarization, can be explained by a two-path multi-path model. Using two different delays and polarizations of the received multi-path components, the resultant polarization can be a function of the relative phase between the two components, which is frequency dependent. In a more realistic multi-path environment, the frequency dependent nature of the received polarization will still hold.

Results

This section outlines the results of the above experiment using the minimum mean squared error (MMSE) filter. Soft decisions of the desired OFDM signal can be illustrated showing the polarization selected by the weight vectors.

1. OFDM Sub-Channel MMSE Filter

Figure 3:
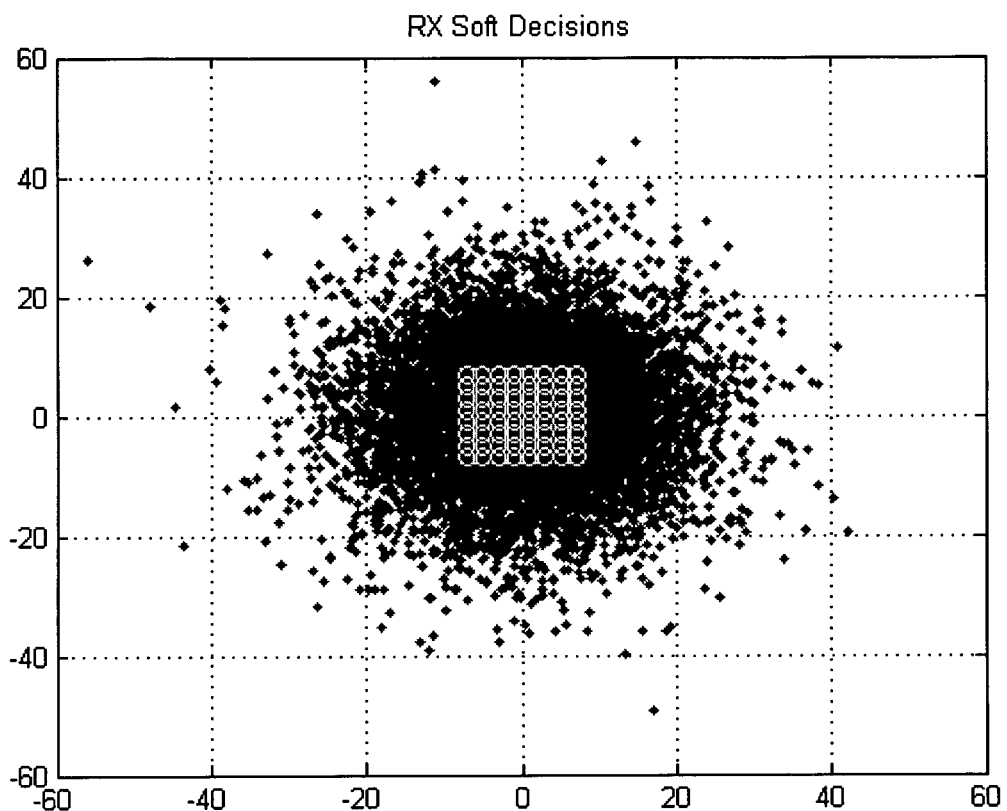
FIG. 3 illustrates a graphical representation of a single OFDM frame with interference and no processing including symbol errors, in accordance with an exemplary embodiment of the present invention.
Figure 4:
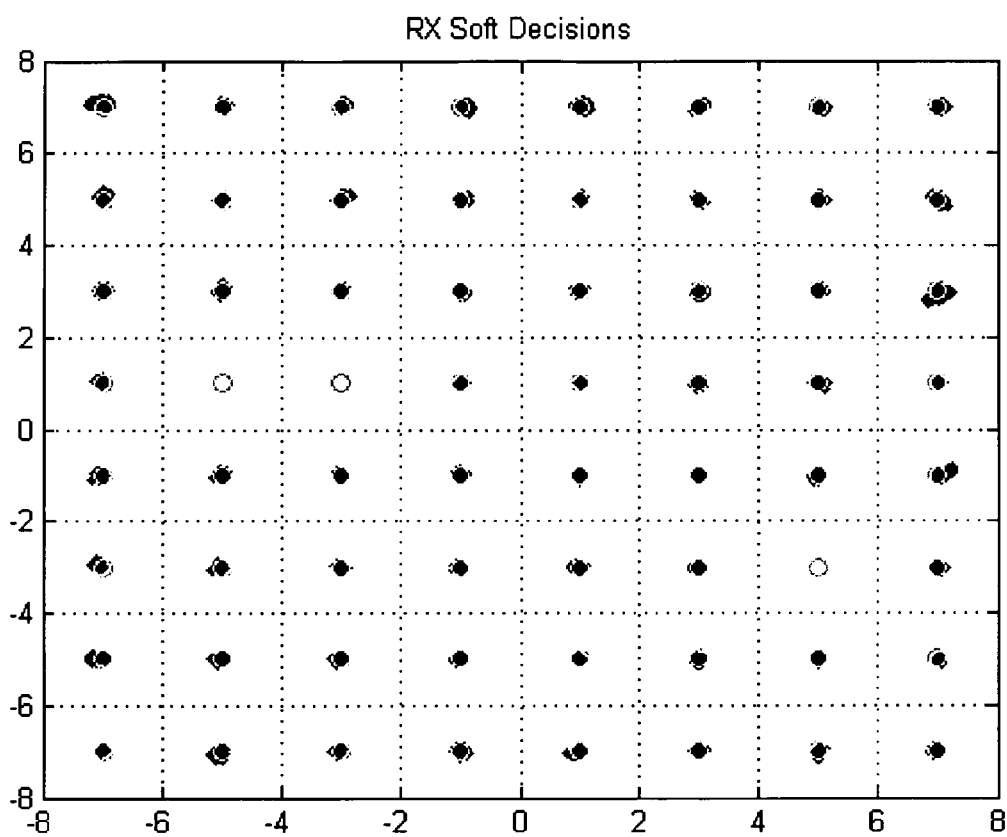
FIG. 4 illustrates a graphical representation of soft decisions of a single OFDM frame with interference after polarization filtering, in accordance with an exemplary embodiment of the present invention.

FIG. 3 illustrates soft decision outputs of the horizontal element after channel equalization when interference is present. The average signal-to-interference ratio (SIR) including the power from both antennas was approximately 0 dB. The dots illustrated in FIG. 3 indicate symbol errors. By applying the MMSE filter weights to the various sub-carriers, and then equalizing the channel, the interference can be suppressed and the desired signal soft decisions can be recovered. The soft decisions at the output of the filter are illustrated in the graph of FIG. 4 and correspond to the desired signal symbols.

2. Poincaré Sphere Analysis

Figure 5:
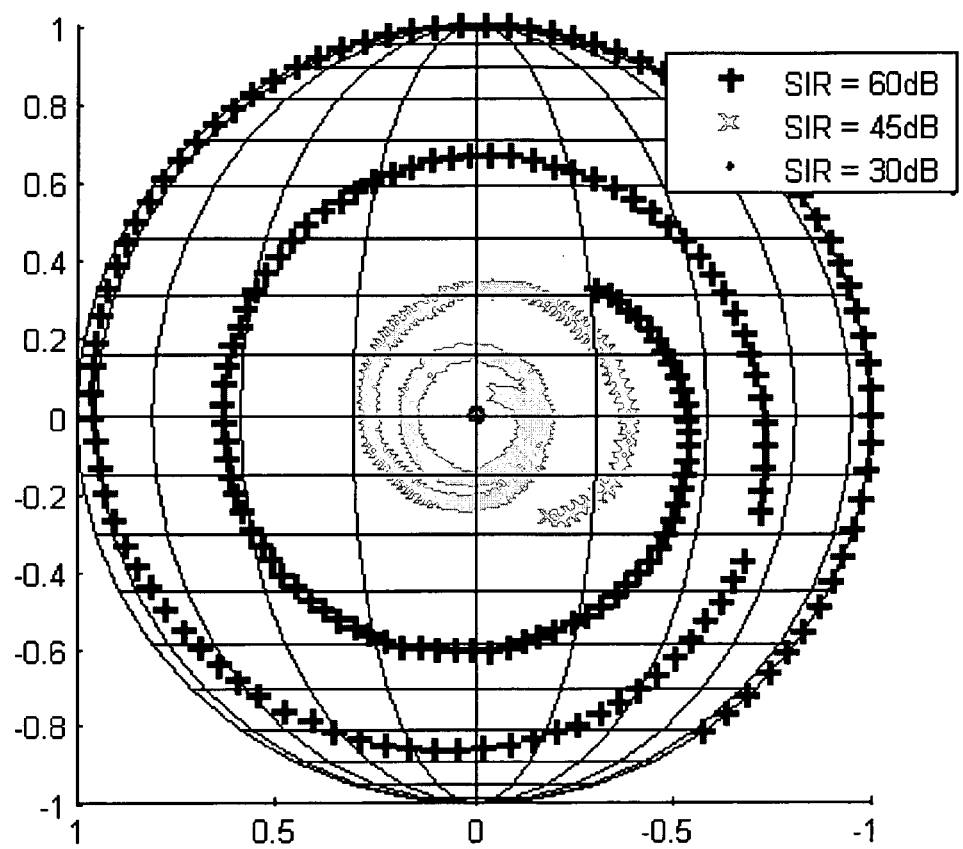
FIG. 5 illustrates a graphical representation of weight vector polarizations for 200 OFDM sub-channels with various signal-to-interference ratios, in accordance with an exemplary embodiment of the present invention.

By plotting the polarization of the weight vectors of the various sub-channels, an understanding of the operation of the MMSE filter can be ascertained. FIG. 5 illustrates the weight vector polarizations for the 200 sub-carriers for three different values of the SIR. When the interference power is extremely low (i.e., SIR=60 dB, which may put the interference close to the noise floor), the weight vectors select polarizations very close to the polarization states of the desired signal sub-carriers, and the adaptive filter comes close to maximizing the polarization coupling of the desired signal.

As the interference power increases, though, the polarization of each of the filter weight vectors gravitates toward the polarization orthogonal to the interference. Because the synthesized interference is fixed at pure horizontal, the weight vector polarizations begin to gravitate toward the vertical polarization on the front of the sphere.

At SIR values less than approximately 30 dB, the polarization state of the weights are almost purely orthogonal to the polarization of the interference in each sub-carrier. For each sub-carrier, the polarization selected by the weight vector lies on an arc between the interference polarization and the point on the opposite end of the sphere; this passes through the desired signal's polarization. In other words, given a single sub-carrier, assume the interference polarization is given by the point $p_d$ and the interference by $p_i$. The polarization orthogonal to $p_i$ is given by $p_i^\perp$. The weight vector polarization lies somewhere along the arc between $p_d$ and $p_i$.

Figure 6:
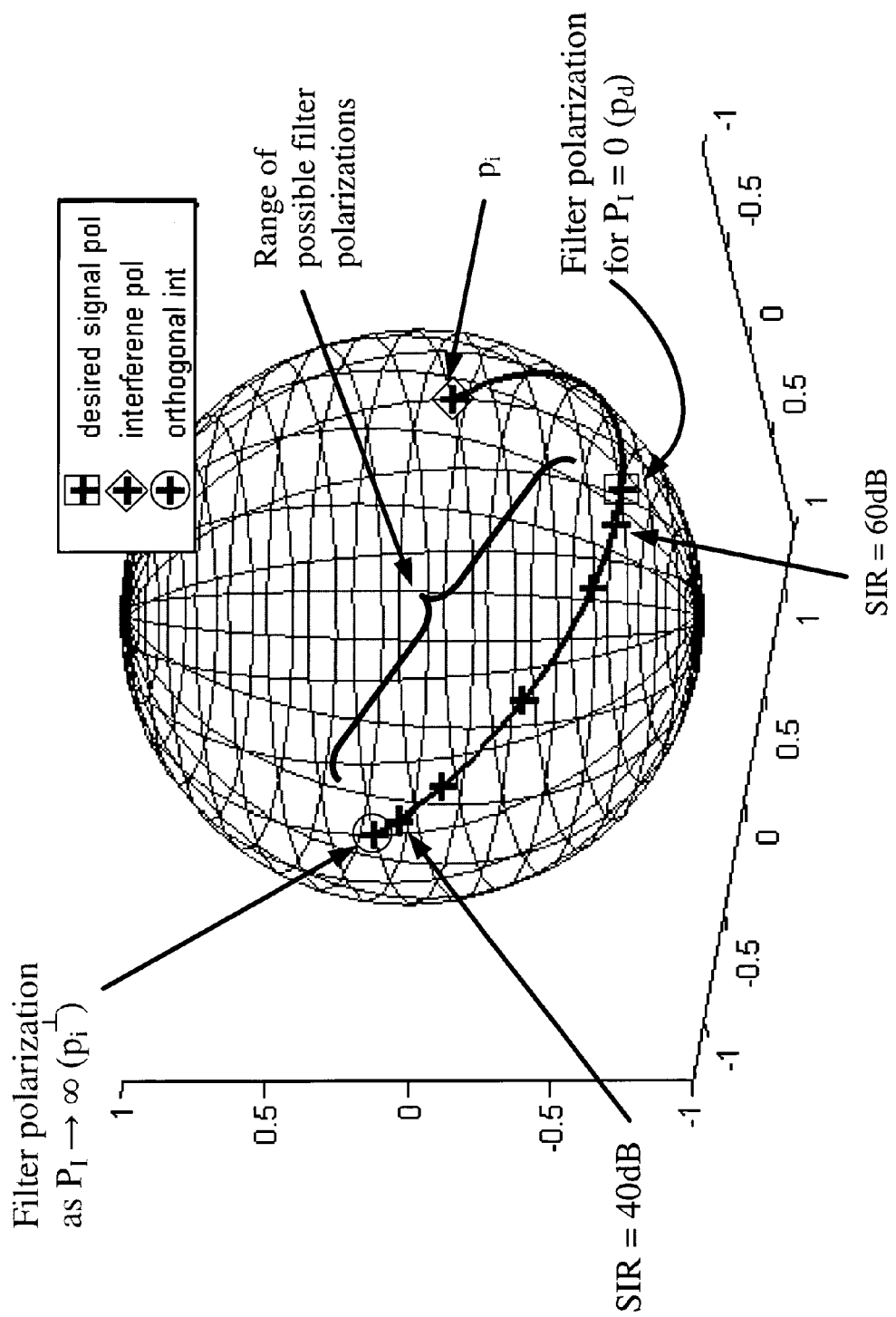
FIG. 6 illustrates a graphical representation of weight vector polarizations for one OFDM sub-channel with signal to interference ratio levels ranging from approximately 60 dB to approximately 40 dB in approximately 5 dB steps, in accordance with an exemplary embodiment of the present invention.

This arc is illustrated in FIG. 6 using collected data by plotting the polarizations of the weight vectors associated with a single OFDM sub-carrier for five different SIR values. When SIR is approximately 60 dB, the weight vector polarization is very close to the desired signal polarization. As the SIR is reduced, the polarization slides along the great arc toward the polarization that is orthogonal to the interference on the sub-carrier. Only one sub-carrier is shown in the plot, but this phenomenon has been verified for all 200 sub-carriers for several values of SIR.

When the interference power is approximately zero, the polarization is selected to yield the maximum signal power. The power couples as $$\cos^2\left(\frac{\gamma}{2}\right),$$

such that $\gamma$ is the arc length between the two points the polarization, and where $\gamma=0$.

As the interference power increases, the filter will move toward selecting the polarization that is orthogonal to the interference in order to nullify it. It balances this against the estimated noise power in order to maximize the SINR. When the filter is nulling the interference, if the desired signal polarization is close to that of the interference, then the arc length between the desired signal and filter polarizations will be close to $\pi$, the power coupling will be close to zero, and the SINR will be low. By adding spatial processing, this problem can be overcome assuming the two signals have different angles of arrival. When the two signals have the same incident angle and the same polarization, space-polarization processing will not be able to cancel the interference.

The results illustrated in FIG. 6 have further been observed, by performing a theoretical analysis to determine the maximum SINR for the problem of co-channel interference mitigation using polarization processing. This analysis substantiates the conclusion with collected data and extends the concept to frequency-domain interference cancellation in OFDM systems.

An exemplary embodiment of the present invention includes a method for mitigating interference for a received wireless signal. The method includes receiving the wireless signal with a receiver device, the wireless signal comprising at least an interference signal and a desired signal; and filtering the received wireless signal with a polarization filter to separate the interference signal from the desired signal. The method can be from an orthogonal frequency division multiplexing system, a code division multiple access system, and the like. The method can further comprise processing the wireless signal. Preferably, the polarization filter is a frequency-based polarization filter.

In another exemplary embodiment of the present invention, the method includes the steps of receiving a wireless data signal comprising an interference signal, a desired signal, and a noise signal; processing the received wireless data signal; applying a first weight vector to the received wireless data signal; calculating a second weight vector for each sub-carrier of the wireless data signal using at least one channel estimate from the desired signal of the received wireless signal and known channel information from the processed interference signal of the received wireless signal; and filtering the received wireless data signal with a polarization filter. In one embodiment, the polarization filter can be a Wiener-Hopf filter. Additionally, the received wireless signal operates in an orthogonal frequency division multiplexing system comprising a plurality of sub-carriers.

Further, sub-band polarization processing has not been considered by others and is herein described as performing better than a single polarization selection for an entire band. This is due to the observed PMD of a short-range indoor wireless channel. The PMD can be accommodated when the polarization is selected on a sub-carrier by sub-carrier basis, rather than the entire band.

While the invention has been disclosed in its preferred forms, it will be apparent to those skilled in the art that many modifications, additions, and deletions can be made therein without departing from the spirit and scope of the invention and its equivalents, as set forth in the following claims.

What is claimed is:

1. A method of mitigating interference for a wireless signal, the method comprising:
   receiving the wireless signal with a receiver device, the wireless signal comprising at least an interference signal and a desired signal;
   breaking the received wireless signal into a plurality of sub-bands; and
   filtering each sub-band in the plurality of sub-bands with a distinct polarization filter to separate the interference signal from the desired signal, wherein each distinct polarization filter is tuned for each sub-band based on a recognized polarization variation as a function of a frequency of a channel on which the wireless signal is received.

2. The method of claim 1, the wireless signal is from an orthogonal frequency division multiplexing system.

3. The method of claim 1, the wireless signal is from a code division multiple access system.

4. The method of claim 1, further comprising processing the wireless signal for retrieving the desired signal of the wireless signal.

5. The method of claim 1, wherein receiving the wireless signal comprises receiving the wireless signal with a dual-polarized antenna.

6. The method of claim 5, wherein the dual-polarized antenna comprises a first antenna element and a co-located and orthogonally-polarized second antenna element, the first antenna element and the second antenna element sharing a common phase center.

7. The method of claim 1, wherein the polarization filter is a frequency-based polarization filter.

8. The method of claim 1, wherein the polarization filter is a Wiener filter.

9. A method of mitigating interference comprising:
   receiving a wireless data signal comprising an interference signal, a desired signal, and a noise signal;
   breaking the received signal into sub-bands;
   applying a distinct weight vector for each sub-band of the wireless data signal using one channel estimate from the desired signal of the received wireless signal and channel information from the interference signal of the received wireless signal, wherein each weight vector is tuned for each sub-band based on a recognized polarization variation as a function of a frequency of a channel on which the wireless data signal is received.

10. The method of claim 9, wherein the received wireless signal operates in an orthogonal frequency division multiplexing system comprising a plurality of sub-carriers.

11. A method of mitigating interference comprising:
receiving at least one wireless data signal of an orthogonal frequency division multiplexing system with a receiver, the wireless data signal comprising at least an interference signal, a desired signal, and a noise signal;
the wireless data signal having the form of:

$$\vec{x} = a_d \vec{h}_d + a_I \vec{h}_I + \vec{n},$$

wherein $\vec{x}$, $\vec{h}_d$, $\vec{h}_I$, and $\vec{n}$ consist of two by one vectors associated with horizontal and vertical elements of the received data ($\vec{x}$), desired signal ($\vec{h}_d$), interference signal ($\vec{h}_I$), and noise ($\vec{n}$), and wherein $a_d$ is the transmitted desired signal and $a_I$ is the transmitted interference signal,
wherein the orthogonal frequency division multiplexing system comprises a plurality of sub-carriers;
processing the received wireless signal by applying a first weight vector, the first weight vector having the form of:

$$\vec{y} = \vec{w}^H \vec{x},$$

wherein $\vec{y}$ is the output of the processed, received wireless signal, and $\vec{w}^H$ is the first weight vector;
calculating a second weight vector for each sub-carrier by using channel estimates from the desired signal ($\vec{h}_d$) and known channel information from the interference signal ($\vec{h}_I$), the weight vector having the form:

$$\vec{w}_{opt} = R_{xx}^{-1} \vec{r}_{xd},$$

wherein $\vec{w}_{opt}$ is the second weight vector, $R_{xx}$ is a auto-correlation matrix, and $\vec{r}_{xd}$ is a cross-correlation vector; and
filtering the received wireless signal with a polarization filter.

12. The method of claim 11, further comprising dividing the received wireless signal into sub-bands for processing the received wireless signal.

* * * * *